US012716837B2

(12) United States Patent
Gdor et al.

(10) Patent No.: US 12,716,837 B2
(45) Date of Patent: Aug. 25, 2026

(54) SCANNING DIFFRACTION BASED OVERLAY SCATTEROMETRY

(71) Applicant: KLA Corporation, Milpitas, CA (US)

(72) Inventors: Itay Gdor, Tel-Aviv (IL); Yuval Lubashevsky, Haifa (IL); Vladimir Levinski, Migdal HaEmek (IL); Daria Negri, Nesher (IL); Nickolai Isakovitch, Tel-Aviv (IL)

(73) Assignee: KLA Corporation, Milpitas, CA (US)

( * ) Notice: Subject to any disclaimer, the term of this patent is extended or adjusted under 35 U.S.C. 154(b) by 135 days.

(21) Appl. No.: 18/615,194

(22) Filed: Mar. 25, 2024

(65) Prior Publication Data

US 2025/0297955 A1 Sep. 25, 2025

(51) Int. Cl.
*G01N 21/47* (2006.01)

(52) U.S. Cl.
CPC . *G01N 21/4785* (2013.01); *G01N 2201/0635* (2013.01); *G01N 2201/0662* (2013.01);
(Continued)

(58) Field of Classification Search
CPC ....... G01N 21/4785; G01N 2201/0635; G01N 2201/0662; G01N 2201/103; G01N 2201/12746
(Continued)

(56) References Cited

U.S. PATENT DOCUMENTS 8,817,115 B1 * 8/2014 Venkatachalam .... G01N 15/147 348/208.4
10,197,389 B2 2/2019 Levinski et al.
(Continued)

FOREIGN PATENT DOCUMENTS

| | | | |
|---|---|---|---|
| CN | 104346808 | A | 2/2015 |
| KR | 20150121275 | A | 10/2015 |
| WO | 2023104469 | A1 | 6/2023 |

OTHER PUBLICATIONS

Adel et al., "Diffraction order control in overlay metrology: a review of the roadmap options," Proc. SPIE. 6922, Metrology, Inspection, and Process Control for Microlithography XXII, 692202. (2008).
(Continued)

*Primary Examiner* — Isiaka O Akanbi
(74) *Attorney, Agent, or Firm* — Suiter Swantz IP

(57) ABSTRACT

A method includes illuminating an overlay target with a plurality of measurement cells. The method further includes receiving time-varying interference signals from a first and second photodetector as an overlay target is scanned along a stage-scan direction by a translation stage when implementing a metrology recipe. The overlay target may include a plurality of measurement cells, where each measurement cell includes a grating-over-grating structures including a first-layer grating feature on a first layer of the sample and a second-layer grating feature on a second layer of the sample in an overlapping region. The first-layer grating feature and the second-layer grating feature may have a similar pitch. The method includes determining one or more differential signals between the first photodetector and the second photodetector for each measurement cell of the plurality of measurement cells. The method includes determining an overlay measurement based on the determined one or more differential signals.

24 Claims, 10 Drawing Sheets

(52) U.S. Cl.
CPC .................. *G01N 2201/103* (2013.01); *G01N 2201/12746* (2013.01)

(58) Field of Classification Search
USPC .......................................... 356/388, 399–401
See application file for complete search history.

(56) References Cited

U.S. PATENT DOCUMENTS 10,268,125 B2 4/2019 Peng et al.
10,824,079 B2 11/2020 Lubashevsky et al.
11,073,768 B2 7/2021 Hill et al.
11,119,417 B2 9/2021 Manassen et al.
11,300,405 B2 4/2022 Manassen et al.
11,300,524 B1 4/2022 Hill et al.
11,409,205 B2 8/2022 Gdor et al.
11,428,642 B2 8/2022 Hill et al.
2003/0016882 A1* 1/2003 Riley .................... G01J 3/2803 382/128
2004/0161165 A1* 8/2004 Riley ........................ G06T 5/50 382/294
2005/0191771 A1* 9/2005 Li ........................ B23K 26/042 438/14
2012/0002785 A1* 1/2012 Kaneko .................. G21K 1/067 359/566
2013/0034209 A1* 2/2013 Ouchi .................. A61B 6/4291 378/62
2015/0036795 A1* 2/2015 Roessl ................. A61B 6/4233 378/36
2015/0323471 A1* 11/2015 Sapiens .............. G01N 21/9501 356/243.4
2016/0047744 A1 2/2016 Adel et al.
2016/0223920 A1 8/2016 Tinnemans et al.
2017/0351184 A1 12/2017 Peng et al.
2018/0373167 A1 12/2018 Grunzweig et al.
2019/0004438 A1 1/2019 Amit et al.
2019/0004439 A1 1/2019 Lubashevsky et al.
2019/0101835 A1 4/2019 Chen
2019/0285407 A1* 9/2019 Chuang ............... G03F 7/70633
2020/0110342 A1* 4/2020 Zhou ................... G03F 7/70633
2020/0337659 A1* 10/2020 Sano .................... A61B 6/4035
2021/0095957 A1* 4/2021 Swillam .............. G03F 7/70616
2021/0137476 A1* 5/2021 Sano ...................... A61B 6/582
2022/0034652 A1* 2/2022 Manassen .......... G01B 9/02043
2023/0168595 A1 6/2023 Hulsebos et al.
2023/0259041 A1 8/2023 Kot et al.
2023/0314319 A1* 10/2023 Manassen ........... G03F 7/70683 356/401

OTHER PUBLICATIONS

PCT International Search Report and Written Opinion for International Application No. PCT/US2021/044111 dated Nov. 22, 2022, 9 pages.
Korean Intellectual Property Office, International Search Report and Written Opinion received in International Application No. PCT/US2025/019481, Jun. 25, 2025, 10 pages.
Ministry of Intellectual Property, International Search Report and Written Opinion received in International Application No. PCT/US2025/034863, Oct. 30, 2025, 8 pages.

* cited by examiner

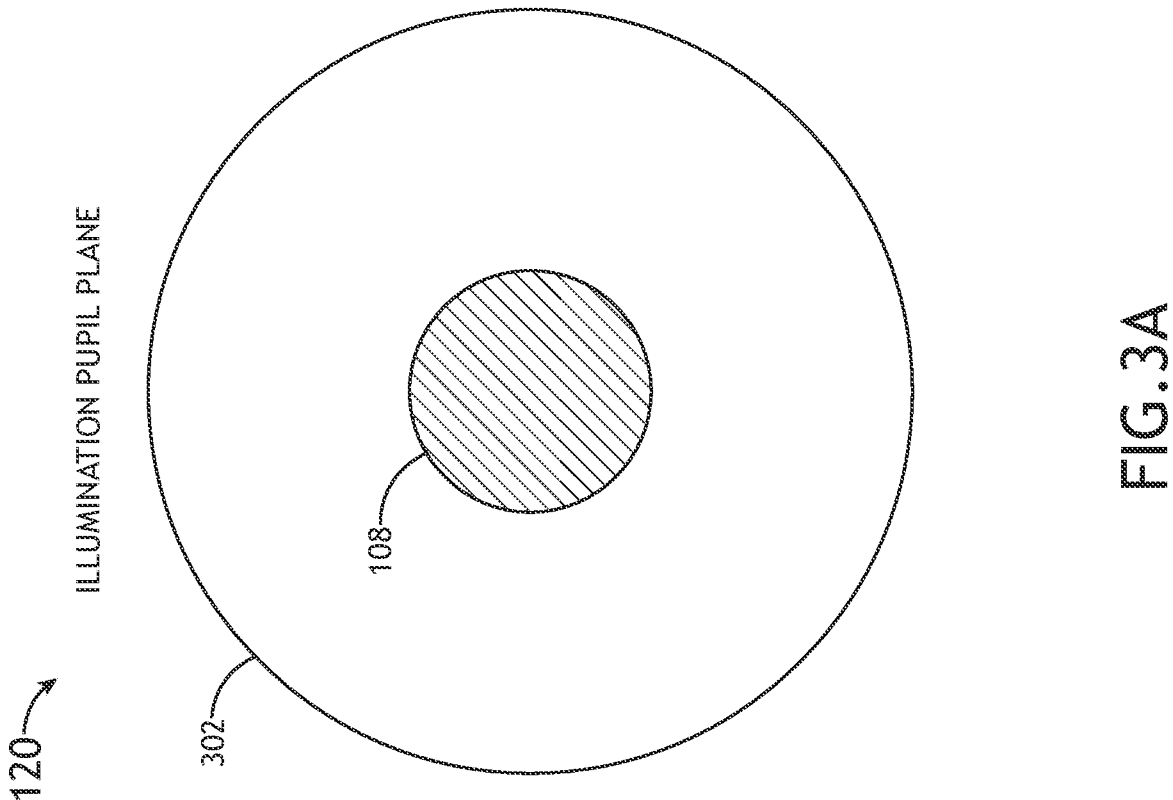
FIG. 3A
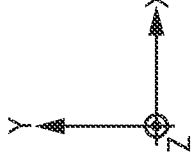

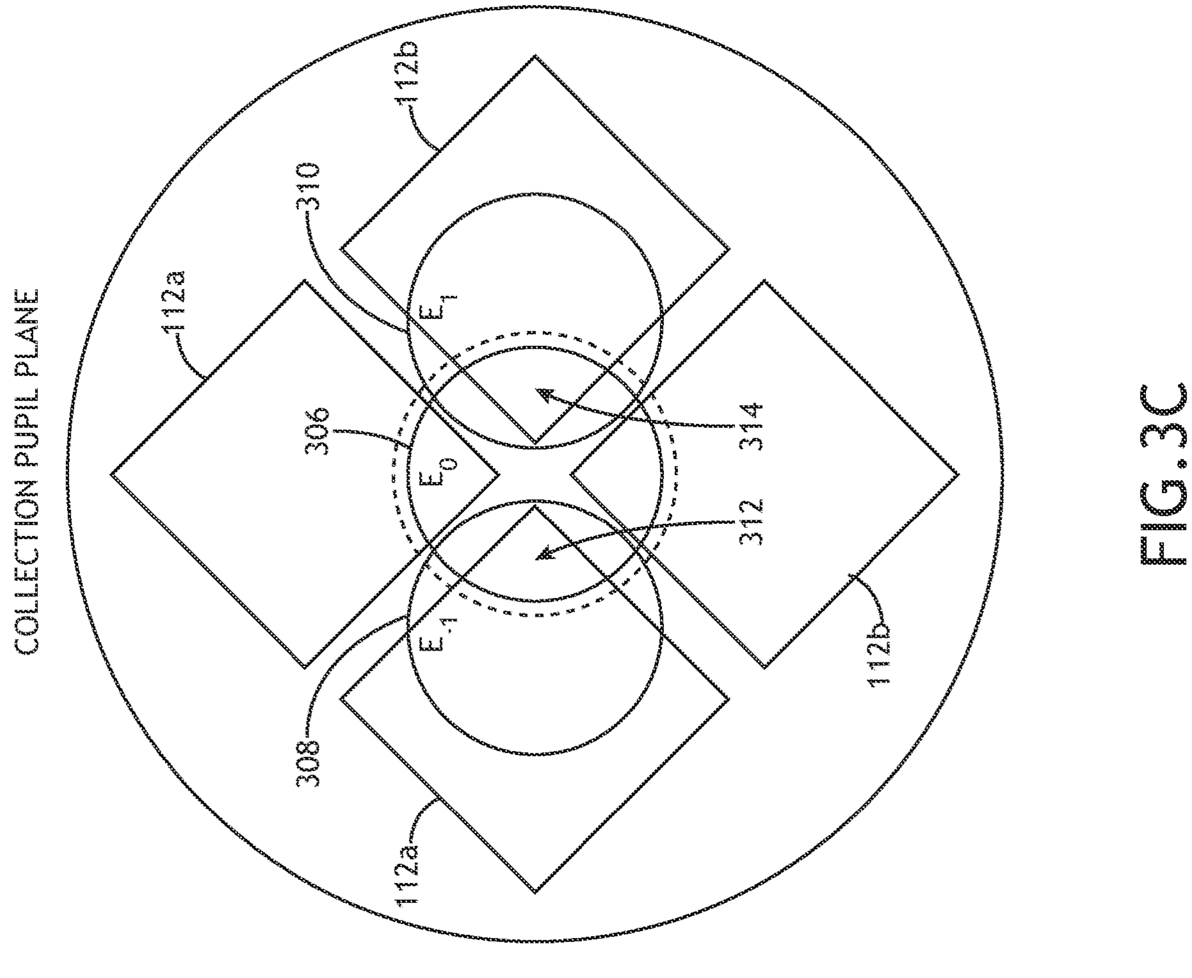
FIG. 3C
114
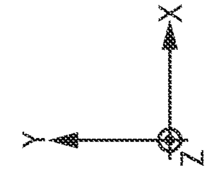

SCANNING DIFFRACTION BASED OVERLAY SCATTEROMETRY

TECHNICAL FIELD

The present disclosure relates generally to overlay metrology and, more particularly, to scanning diffraction based overlay scatterometry.

BACKGROUND

Overlay metrology generally refers to measurements of the relative alignment of layers on a sample such as, but not limited to, semiconductor devices. An overlay measurement, or a measurement of overlay error, typically refers to a measurement of the misalignment of fabricated features on two or more sample layers. In a general sense, proper alignment of fabricated features on multiple sample layers is necessary for proper functioning of the device.

Demands to decrease feature size and increase feature density are resulting in correspondingly increased demand for accurate and efficient overlay metrology. Metrology systems typically generate metrology data associated with a sample by measuring or otherwise inspecting dedicated metrology targets distributed across the sample. Accordingly, the sample is typically mounted on a translation stage and translated such that the metrology targets are sequentially moved into a measurement field of view. In typical metrology systems employing a move and measure (MAM) approach, the sample is static during each measurement and requires many different target location measurements. However, the time required for the translation stage to settle prior to a measurement may impact the throughput. Further, image-based scatterometry overlay techniques require a high sensitivity camera (e.g., CCD camera) that contributes to the cost of the metrology sub-system and requires two separate measurements per direction such that measurement of a single target is time consuming.

Therefore, it is desirable to provide systems and methods for curing the above deficiencies.

SUMMARY

An overlay metrology system is disclosed, in accordance with one or more embodiments of the present disclosure. In embodiments, an overlay metrology system includes an illumination sub-system. In embodiments, the illumination sub-system includes one or more illumination sources configured to generate one or more illumination beams. In embodiments, the illumination sub-system includes one or more illumination optics configured to direct the one or more illumination beams to an overlay target on a sample as the sample is scanned along a stage-scan direction by a translation stage when implementing a metrology recipe, where the overlay target in accordance with the metrology recipe includes a plurality of measurement cells, where each measurement cell includes a grating-over-grating structures including a first-layer grating feature on a first layer of the sample and a second-layer grating features on a second layer of the sample in an overlapping region, where the first-layer grating feature and the second-layer have a common pitch. In embodiments, the overlay metrology system includes a collection sub-system. In embodiments, the collection sub-system includes a first photodetector located in a pupil plane at a location of overlap between 0-order diffraction from the overlay target and +1-order diffraction from the overlay target. In embodiments, the collection sub-system includes a second photodetector located in a pupil plane at a location of overlap between 0-order diffraction from the overlay target and −1-order diffraction from the overlay target. In embodiments, the collection sub-system includes one or more collection optics. In embodiments, the overlay metrology system includes a controller communicatively coupled to the first photodetector and the second photodetector, the controller including one or more processors configured to execute program instructions causing the one or more processors to: receive time-varying interference signals from the first photodetector and the second photodetector as the overlay target is scanned along the stage-scan direction; determine one or more differential signals between the first photodetector and the second photodetector for each measurement cell of the plurality of measurement cells; and determine an overlay measurement based on the determined one or more differential signals.

An overlay metrology system is disclosed, in accordance with one or more embodiments of the present disclosure. In embodiments, the overlay metrology system includes a controller communicatively coupled to a first photodetector and a second photodetector, the controller including one or more processors configured to execute program instructions causing the one or more processors to: receive time-varying interference signals from the first photodetector and the second photodetector as an overlay target is scanned along a stage-scan direction by a translation stage when implementing a metrology recipe, wherein the overlay target in accordance with the metrology recipe includes a plurality of measurement cells, where each measurement cell includes a grating-over-grating structures including a first-layer grating feature on a first layer of the sample and a second-layer grating features on a second layer of the sample in an overlapping region, where the first-layer grating feature and the second-layer have a similar pitch; determine one or more differential signals between the first photodetector and the second photodetector for each measurement cell of the plurality of measurement cells; and determine an overlay measurement based on the determined one or more differential signals.

A method is disclosed, in accordance with one or more embodiments of the present disclosure. In embodiments, the method includes illuminating an overlay target with a plurality of measurement cells on a sample having grating-over-grating structures as the sample is translated along a stage-scan direction with an illumination beam, where 0-order diffraction overlaps with first-order diffraction in a collection pupil. In embodiments, the method includes receiving time-varying interference signals from a first photodetector and a second photodetector as an overlay target is scanned along a stage-scan direction by a translation stage when implementing a metrology recipe, where the overlay target in accordance with the metrology recipe includes a plurality of measurement cells, where each measurement cell includes a grating-over-grating structures including a first-layer grating feature on a first layer of the sample and a second-layer grating features on a second layer of the sample in an overlapping region, where the first-layer grating feature and the second-layer have a similar pitch. In embodiments, the method includes determining one or more differential signals between the first photodetector and the second photodetector for each measurement cell of the plurality of measurement cells; and determining an overlay measurement based on the determined one or more differential signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 3A is a top view of an illumination pupil in an illumination pupil plane of the overlay metrology sub-system, in accordance with one or more embodiments of the present disclosure.

FIG. 3C is a top view of a collection pupil in the collection pupil plane of the overlay metrology sub-system, in accordance with one or more embodiments of the present disclosure.

DETAILED DESCRIPTION

Figure 1A:
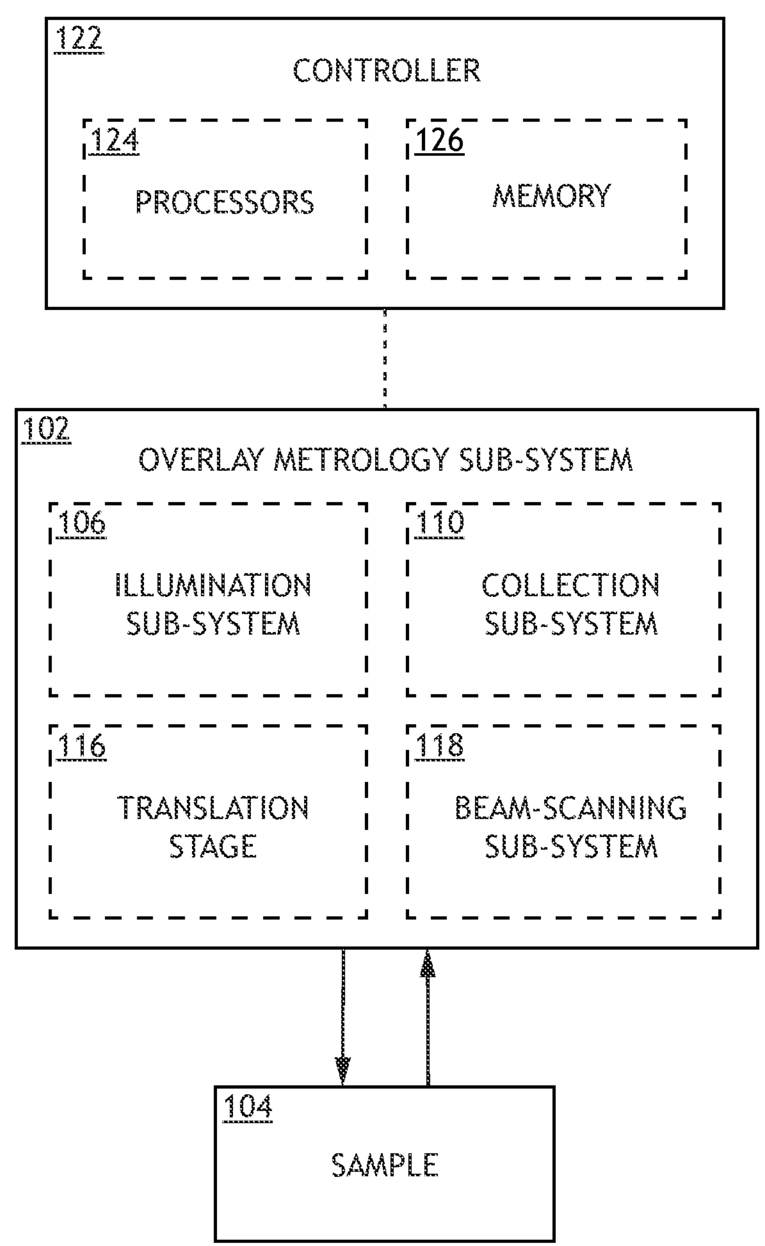
FIG. 1A is a conceptual view of a system for performing scanning diffraction based overlay scatterometry metrology, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to diffraction based overlay (DBO) scanning scatterometry metrology. For example, the DBO scanning scatterometry metrology may provide ultra-fast grey-scatterometry overlay (SCOL) metrology. For example, the overlay metrology target may include a plurality of cells including a grating-over-grating structure formed from overlapping regions of periodic structures on two or more sample layers that is illuminated with an illumination beam having a limited angular extent to generate discrete diffraction orders. The two or more photodetectors may detect time-varying interference signals from the overlay metrology target associated with positive and negative diffraction in a collection pupil generated as the grating-over-grating structure is scanned through an illumination beam. In embodiments, illumination and collection conditions are configured such that 0-order diffraction and first-order diffraction (e.g., +/−1 diffraction orders) overlap in a collection pupil plane. For example, −1 diffraction may overlap with one side of the 0-order diffraction and +1 diffraction may overlap with an opposing side of the 0-order diffraction. The two or more photodetectors may be placed in each of the overlapping regions of the pupil plane to capture time-varying interference signals associated with the +1 and −1 diffraction orders generated as the sample is scanned with respect to the illumination beam. In this way, the 0-order diffraction may serve as a common reference for the two time-varying interference signals. Differential signals between the two or more photodetectors for each cell of the plurality of cells may then be generated, such that an overlay measurement may be generated based on the respective differential signals.

It is contemplated herein that the overlay measurement generated based on the respective differential signals may be extremely sensitive to the position of the diodes. For example, a misalignment between the two or more photodetectors may cause the intensity at each of two or more photodetectors to be imbalanced (e.g., intensity at one photodetector being different than the intensity at a separate photodetector). Misalignment in the two or more photodetectors may mean the 0-order diffraction lobe is not equally centered between the first-order diffraction lobes, thereby causing such imbalance in intensity.

Embodiments of the present disclosure are further directed to performing calibration based on misalignment between the two or more photodetectors. For example, calibration may be performed by calibrating the time-varying interference signals from each photodetector of the two or more photodetectors based on a calibration signal from a calibration cell. For instance, the calibration signal may be used to normalize the respective time-varying interference signals. In this regard, the time-varying interference signals from each photodetector may be divided by the calibration signals from the calibration cell, which may include 0-order light and/or diffracted light. As such, the overlay measurement calculated based on the differential signals may compensate for the imbalance of intensity. It is contemplated herein that calibration may be performed "on the fly" during scanning or post-measurement (e.g., during post-processing).

For the purposes of the present disclosure, the term scatterometry metrology is used to broadly encompass the terms scatterometry-based metrology and diffraction-based metrology in which a sample having periodic features on one or more sample layers is illuminated with an illumination beam having a limited angular extent and one or more distinct diffraction orders are collected for the measurement. Further, the term scanning metrology is used to describe metrology measurements generated when samples are in motion. In a general sense, scanning metrology may be implemented by scanning a sample along a measurement path (e.g., a swath, or the like) such that regions of interest on the sample (e.g., metrology targets, device areas, or the like) are translated through a measurement field of view of a metrology system. Further, the process may be repeated for any number of measurement paths or repeated measurements of particular measurement paths to provide any desired number of measurements of the sample.

It is contemplated herein that intensity profiles of diffraction orders (e.g., +/−1 diffraction orders), as well as symmetry between positive and negative diffraction orders, in a collection pupil plane may be influenced by various characteristics of the grating-over-grating structure. For example, each diffraction order in the pupil plane may include diffracted light from the various gratings on the various layers of the grating-over-grating structure. Phase differences between light associated with diffraction from different sample layers may then result in intensity variations in the pupil plane such as, but not limited to, interference fringes. As a result, the intensity profile of a diffraction order in a collection pupil may be uniform or slowly-varying for grating-over-grating structures formed from relatively thin sample layers and may exhibit more pronounced variations for relatively thick sample layers.

It is additionally contemplated herein that, regardless of the particular intensity profile, the symmetry between positive and negative diffraction orders (e.g., +/−1 diffraction orders) may also be influenced by various characteristics of the grating-over-grating structures. For example, asymmetries in the grating-over-grating structure such as, but not limited to, the relative alignment of the grating features in the various layers, may manifest as asymmetries between positive and negative diffraction orders. As an illustration, a fully symmetric grating-over-grating structure may generate symmetric positive and negative diffraction orders. In contrast, sample asymmetries such as overlay errors may induce asymmetries between various aspects of the positive and negative diffraction orders such as, but not limited to, the relative intensity or phase between the positive and negative diffraction orders.

As a result, metrology measurements of asymmetries of the grating-over-grating structures such as overlay measurements may be generated based on comparisons of positive and negative diffraction orders. For example, scatterometry overlay based on pupil-plane images of diffraction orders of static samples is described generally in U.S. Pat. No. 10,824,079, issued on Nov. 3, 2020; U.S. Pat. No. 10,197,389, issued on Feb. 5, 2019; and U.S. Pat. No. 11,119,417, issued on Sep. 14, 2021, which is incorporated herein by reference in its entirety. In this publication, phase shifts associated with an overlay measurement between +1 and −1 diffraction orders are determined through an analysis of at least one pupil-plane image in which a −1 diffraction order, a +1 diffraction order, and a 0 diffraction order are spatially separated in the pupil plane.

However, it is further contemplated herein that techniques based on pupil-plane images of static samples may have limited measurement throughput based at least in part on the time required to start and stop a translation stage when positioning an overlay target or other portion of the sample for a measurement.

The systems and methods disclosed herein may be suitable for a wide variety of sample layouts including samples with relatively thin and relatively thick sample layers. For example, the systems and methods disclosed herein may be well suited for samples with relatively thin sample layers such as, but not limited to dynamic random-access memory (DRAM) structures. In this regard, intensity distributions of diffraction orders in the collection pupil may be relatively uniform as described previously herein, which may provide relatively low tolerances for placement of photodetectors in the overlap regions. However, the systems and methods disclosed herein may also be suitable for samples having relatively thicker layers. In this case, the placement of the photodetectors may be accurately placed in symmetric regions of the positive and negative diffraction orders. Further, the systems and/or measurements may be calibrated to increase measurement accuracy.

It is further contemplated herein that the systems and methods disclosed herein may provide sensitive overlay metrology at a high throughput. For example, the non-imaging configuration enables the use of fast photodetectors suitable for fast scan speeds. As a non-limiting example, photodetectors having a bandwidth of 1 GHz may enable scan speeds of approximately 10 centimeters per second on grating-over-grating targets having a pitch of 1 micrometer.

Some embodiments of the present disclosure are directed to providing recipes for configuring an overlay metrology sub-system. An overlay metrology sub-system is typically configurable according to a recipe including a set of parameters for controlling various aspects of an overlay measurement such as, but not limited to, the illumination of a sample, the collection of light from the sample, or the position of the sample during a measurement. In this way, the overlay metrology sub-system may be configured to provide a selected type of measurement for one or more overlay target designs of interest. For example, a metrology recipe may include illumination parameters such as, but not limited to, a number of illumination beams, an illumination wavelength, an illumination pupil distribution (e.g., a distribution of illumination angles and associated intensities of illumination at those angles), a polarization of incident illumination, or a spatial distribution of illumination. By way of another example, a metrology recipe may include collection parameters such as, but not limited to, a collection pupil distribution (e.g., a desired distribution of angular light from the sample to be used for a measurement and associated filtered intensities at those angles), collection field stop settings to select portions of the sample of interest, polarization of collected light, wavelength filters, positions of one or more detectors (e.g., photodetectors) or parameters for controlling the one or more detectors. By way of a further example, a metrology recipe may include various parameters associated with the sample position during a measurement such as, but not limited to, a sample height, a sample orientation, whether a sample is static during a measurement, or whether a sample is in motion during a measurement (along with associated parameters describing the speed, scan pattern, or the like).

The grating-over-grating features suitable for generating the diffraction patterns of interest may generally be located anywhere on the sample. In embodiments, overlay metrology may be performed directly on device features having suitable geometries. By way of another example, overlay metrology may be performed on dedicated overlay targets, which may be located at any suitable locations such as, but not limited to, within dies or within scribe lines between dies. In this way, overlay measurements on overlay targets may be representative of the overlay of device features. Dedicated overlay targets may generally include features that are designed to provide accurate overlay measurements based on a particular overlay measurement technique. Further, overlay targets may include one or more measurement cells, where each cell includes printed elements in overlapping regions of one or more layers on the sample. An overlay measurement may then be based on any combination of measurements of the various cells of the overlay target. For example, multiple cells of an overlay target may be designed with different intended offsets (e.g., grating structures in the various layers of the sample that are intentionally misaligned with known offset values), which may improve the accuracy and/or sensitivity of the measurement.

It is contemplated herein that scanning DBO scatterometry metrology as disclosed herein may provide numerous benefits. For example, the capability to capture measurement signals indicative of overlay as a sample is scanned may avoid stage acceleration and deceleration times required to capture an image of a static target and may thus provide relatively high measurement throughput. In this way, the number of overlay measurements in a given time period may be substantially increased. By way of another example, the systems and method disclosed herein may provide a straightforward extension of current scatterometry overlay metrology architectures and targets to scanning-mode metrology. For instance, systems designed for pupil plane imaging may be modified or supplemented to include photodetectors as disclosed herein to generate time-varying interference signals.

It is further contemplated herein that scanning DBO scatterometry metrology as disclosed herein may be implemented in combination with additional scanning scatterometry overlay metrology techniques. In one embodiment, the use of two pupil-plane photodetectors to generate time-varying interference signals may be combined with image-plane scatterometry overlay metrology techniques. For example, image-plane scatterometry overlay metrology is described generally in U.S. Pat. No. 11,428,642, issued on Aug. 30, 2022, which is incorporated herein by reference in its entirety.

Referring now to FIGS. 1A-4, systems and methods for scanning DBO scatterometry metrology are described in greater detail in accordance with one or more embodiments of the present disclosure.

FIG. 1A is a conceptual view of a system 100 for performing scanning DBO scatterometry metrology, in accordance with one or more embodiments of the present disclosure.

Figure 1B:
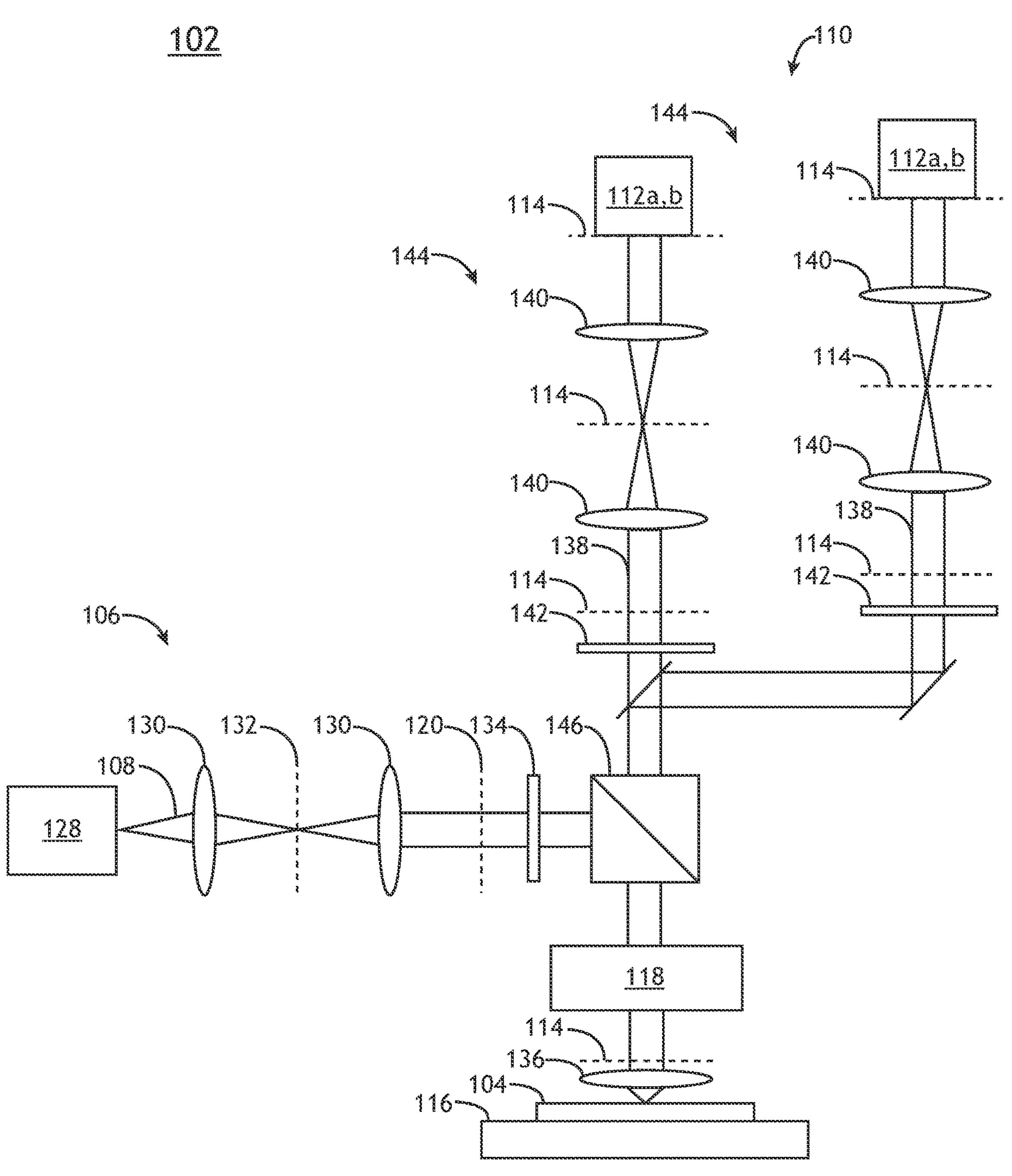
FIG. 1B is a schematic view of the overlay metrology sub-system, in accordance with one or more embodiments of the present disclosure.

In embodiments, the system 100 includes an overlay metrology sub-system 102 to perform scatterometry overlay measurements on sample 104. For example, the overlay metrology sub-system 102 may perform scatterometry overlay measurements on portions of the sample 104 having grating-over-grating structures such as, but not limited to dedicated overlay targets. FIG. 1B is a schematic view of the overlay metrology sub-system 102 in accordance with one or more embodiments of the present disclosure.

In embodiments, the overlay metrology sub-system 102 includes an illumination sub-system 106 to generate illumination in the form of one or more illumination beams 108 to illuminate the sample 104 and a collection sub-system 110 to collect light from the illuminated sample 104. For example, the one or more illumination beams 108 may be angularly limited on the sample 104 such that grating-over-grating structures (e.g., in one or more cells of an overlay target) may generate discrete diffraction orders. Further, the one or more illumination beams 108 may be spatially limited such that they may illuminate selected portions of the sample 104. For instance, each of the one or more illumination beams 108 may be spatially limited to illuminate a particular cell of an overlay target.

The collection sub-system 110 may then collect at least 0-order diffraction (e.g., specular reflection) and +/−1 diffraction orders from the sample 104 associated with diffraction of the illumination beam 108. Further, the collection sub-system 110 may include at least two photodetectors 112 positioned in a collection pupil plane 114 at locations of overlap between the 0-order diffraction and the +/−1 diffraction orders.

In embodiments, the overlay metrology sub-system 102 includes a translation stage 116 to scan the sample 104 through a measurement field of view of the overlay metrology sub-system 102 during a measurement to implement scanning metrology.

In embodiments, the overlay metrology sub-system 102 includes a beam-scanning sub-system 118 configured to modify or otherwise control a position of at least one illumination beam 108 on the sample 104. For example, the beam-scanning sub-system 118 may scan an illumination beam 108 in a direction orthogonal to a scan direction (e.g., a direction in which the translation stage 116 scans the sample 104) during a measurement.

Referring now to FIGS. 2A-3B, the collection of diffraction orders from grating-over-grating structures and the placement of the photodetectors 112 for scanning scatterometry overlay metrology is described in greater detail in accordance with one or more embodiments of the present disclosure.

Figure 2A:
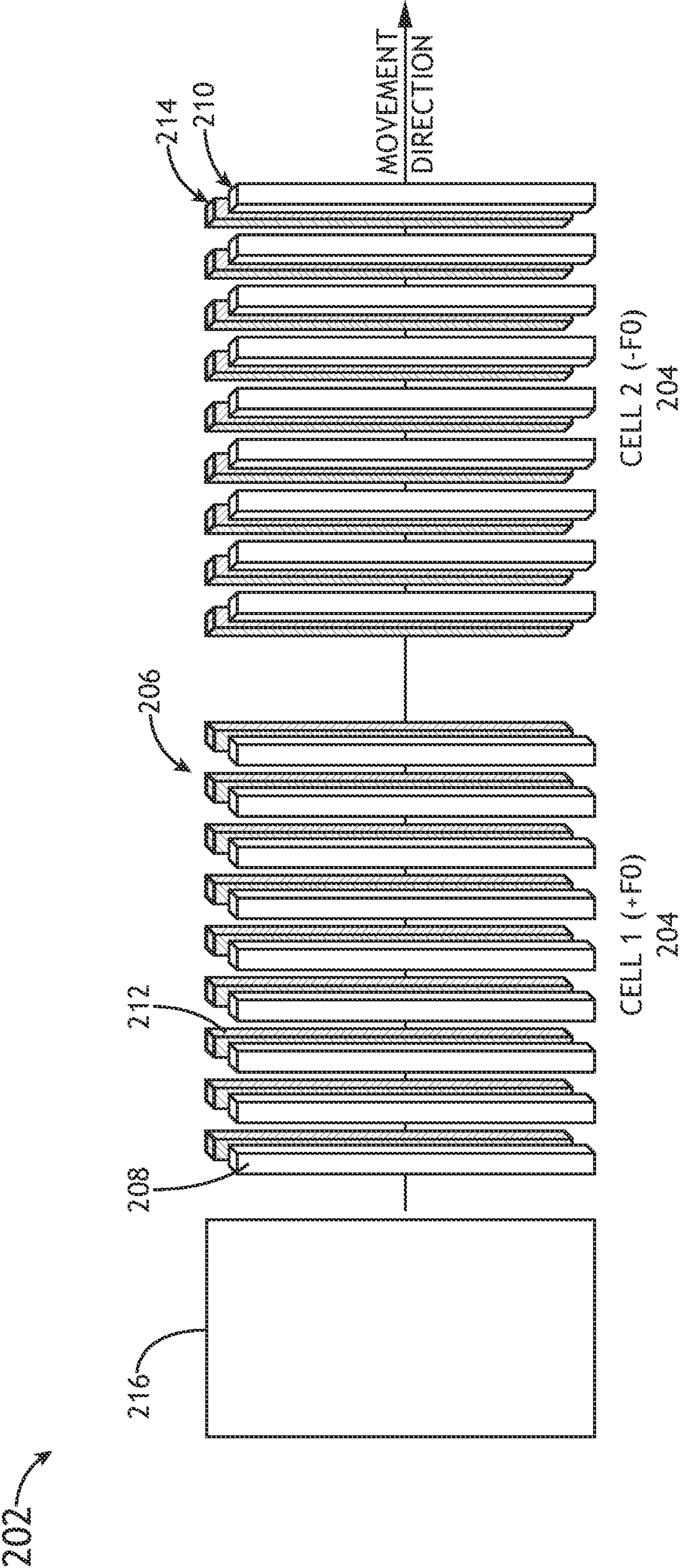
FIG. 2A is a perspective view of an overlay target on a sample including measurement cells and a calibration cell, in accordance with one or more embodiments of the present disclosure.
Figure 2B:
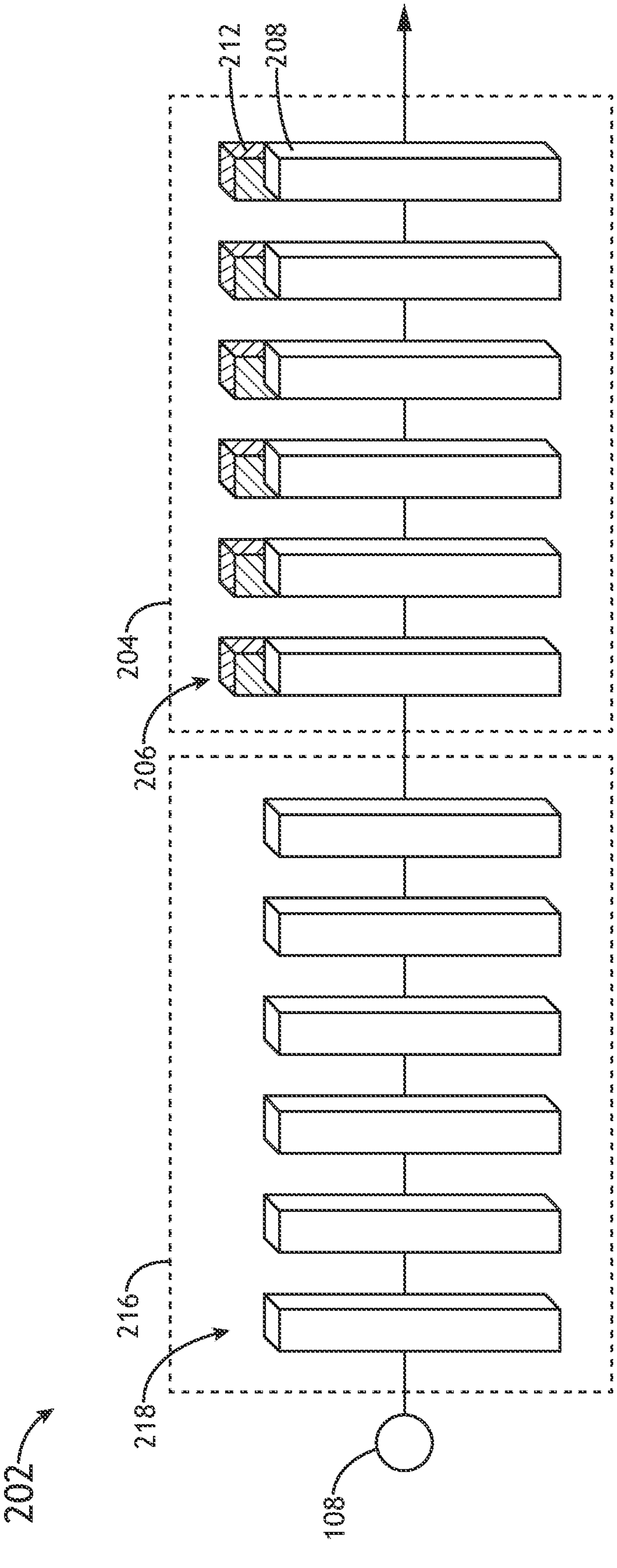
FIG. 2B is a perspective view of an overlay target on a sample including measurement cells and a calibration cell, in accordance with one or more embodiments of the present disclosure.
Figure 2C:
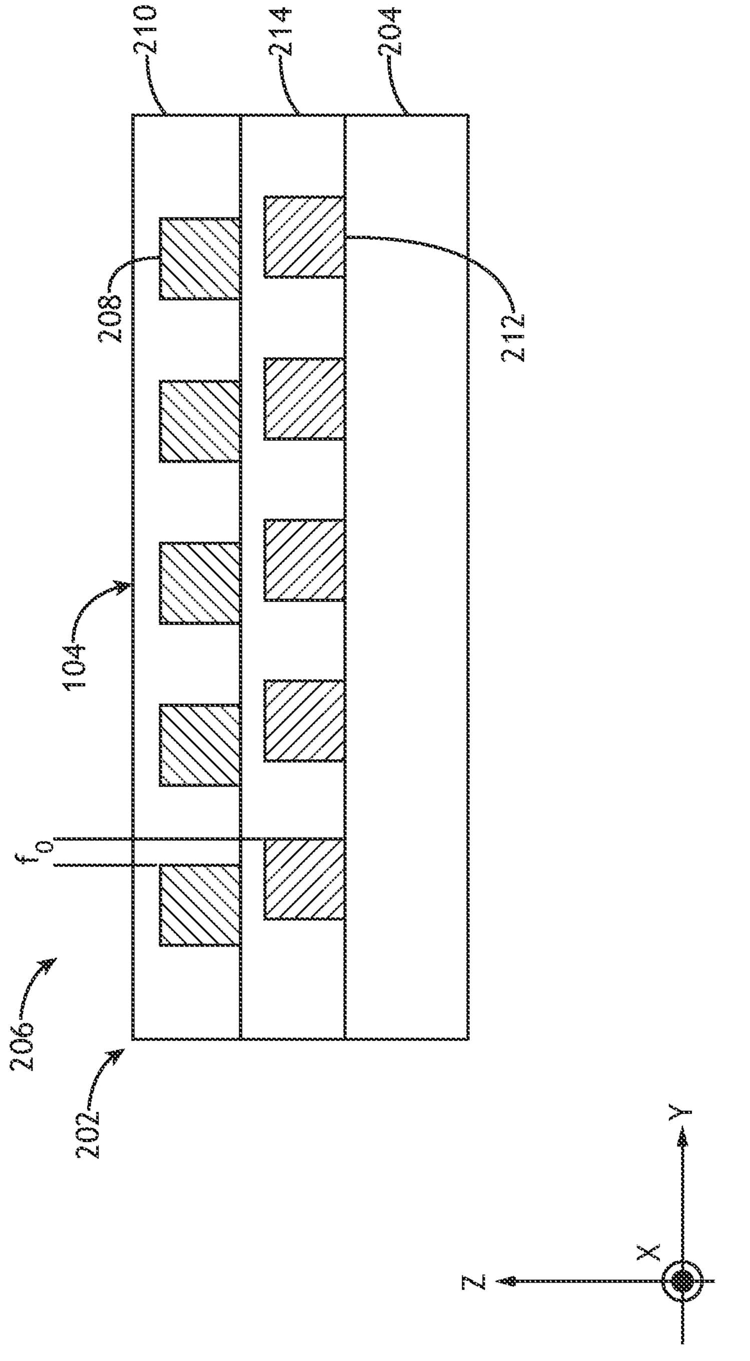
FIG. 2C is a side view of a measurement cell of the overlay target, in accordance with one or more embodiments of the present disclosure.

FIGS. 2A-2B are perspective views of an overlay target 202 having one or more measurement cells 204 with a grating-over-grating structure 206 and calibration cell 216, in accordance with one or more embodiments of the present disclosure. FIG. 2C is a side view of a cell 204 of the overlay target 202, in accordance with one or more embodiments of the present disclosure.

In embodiments, the overlay target 202 includes the plurality of measurement cells 204, where any particular measurement cell 204 may include a grating structure 206 with a periodicity along any direction.

In embodiments, the grating structure 206 includes two or more diffraction gratings. For example, the grating structure 206 may include a first structure 208 (e.g., first-layer grating feature 208) located on a first layer 210 of the sample 104 and second structure 212 (e.g., second-layer grating feature 212) located on a second layer 214 of the sample 104. For instance, the grating structure 206 may include a grating-over-grating structure, where the first structure 208 and the second structure 212 are overlapping.

In embodiments, the first structure 208 and the second structure 212 have the same pitches. It is noted herein that some existing scanning techniques utilize targets having different pitches. It is contemplated herein, that due to design rules, it is in some cases impossible to print grating-over-grating structures with different pitches (e.g., overlapping structures having different pitches), especially in cut mask process layers. As such, it is advantageous for the overlay target 202 to include features having the same pitch.

Further, it is contemplated herein that the configuration depicted in FIGS. 2A-2C are provided merely for illustrative purposes and shall not be construed as limiting the scope of the present disclosure. As such, the grating structure 206 may be formed of any number of layers with any variety of pitches. For example, the grating structure 206 may be formed of two or more layers.

It is to be understood that the overlay target 202 in FIGS. 2A-2C and the associated description are provided solely for illustrative purposes and should not be interpreted as limiting. Rather, the overlay target 202 may include any suitable grating-over-grating overlay target design. For example, the overlay target 202 may include any number of cells 204 suitable for measurements along two directions. For instance, to measure overlay in the x- or y-direction, the overlay target 202 may include two cells with opposite intended offsets ($\pm f_0$). In this regard, as shown in FIG. 2A, a first cell may have an intended offset $+f_0$ and a second cell may have an intended offset $-f_0$. Further, the cells 204 may be distributed in any pattern or arrangement. For example, metrology target designs suitable for scanning metrology are generally described in U.S. Pat. No. 11,073,768, issued on Jul. 27, 2021, which is incorporated herein by reference in its entirety.

In embodiments, the overlay target 202 includes a calibration cell 216. For example, as shown in FIG. 2A, the calibration cell 216 may include a blank area (i.e., without any grating structures). For instance, calibration signals from the blank area of the calibration cell 216 may be used for calibrating the time-varying interference signals from each photodetector of the two or more photodetectors 112*a, b*. By way of another example, as shown in FIG. 2B, the calibration cell 216 may include a calibration grating structure 218. For instance, calibration signals from the calibration grating structure 218 of the calibration cell 216 may be used for calibrating the time-varying interference signals from each photodetector of the two or more photodetectors 112*a,b*. It is contemplated that the calibration grating structure 218 may have a similar pitch to the grating structures 206 in the measurement cell 204.

In embodiments, the calibration cell 216 is arranged next to the measurement cell 204. For example, the calibration cell 216 may be arranged next to the first measurement cell 204. In this regard, the calibration cell 216 may be scanned by the illumination beam prior to scanning the grating structures 206 of the first and second cells 204. It is contemplated herein that the calibration cell 216 may be in the same cell or a different cell than the grating structure 206.

Figure 3B:
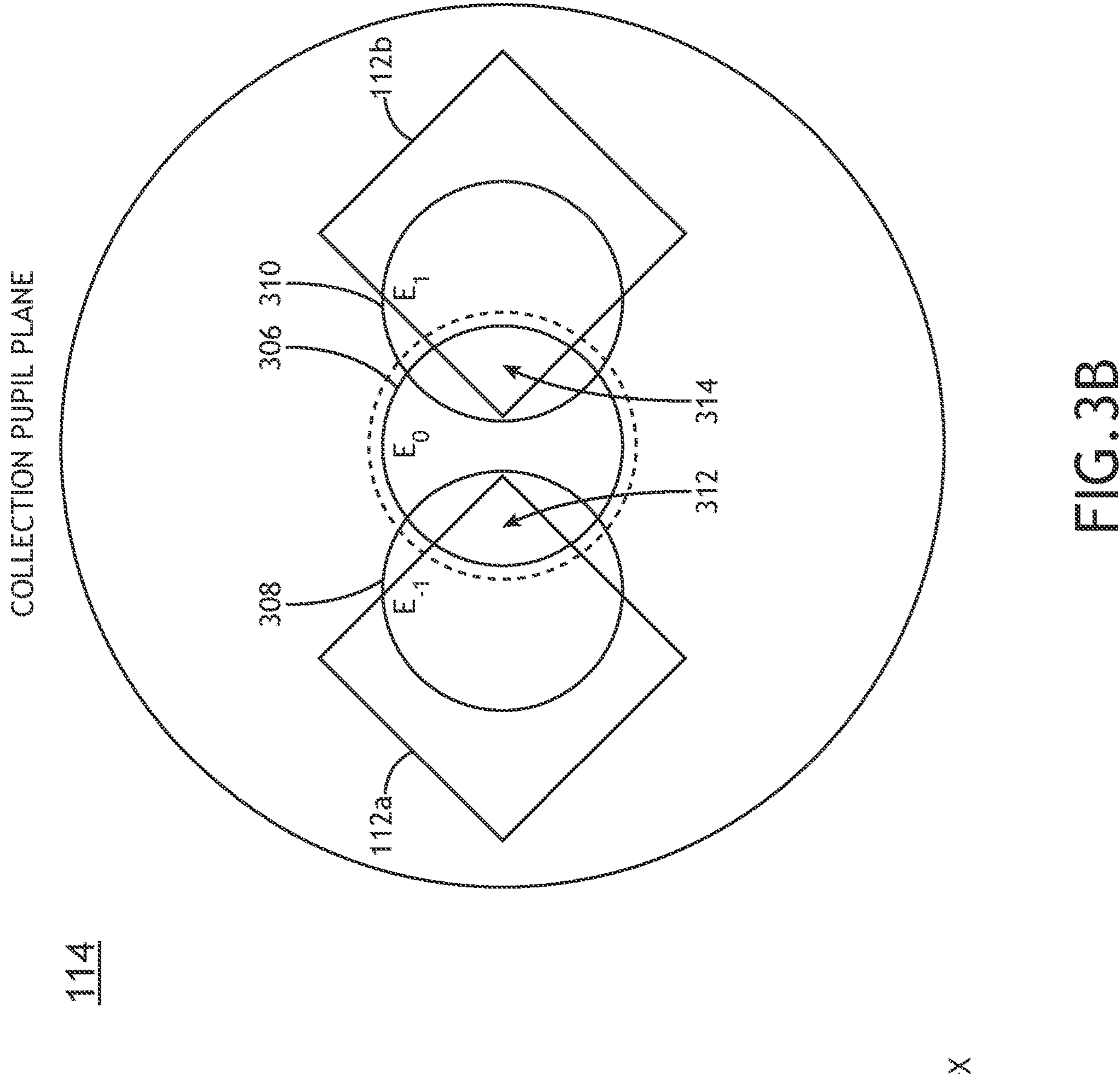
FIG. 3B is a top view of a collection pupil in the collection pupil plane of the overlay metrology sub-system, in accordance with one or more embodiments of the present disclosure.
Figure 3D:
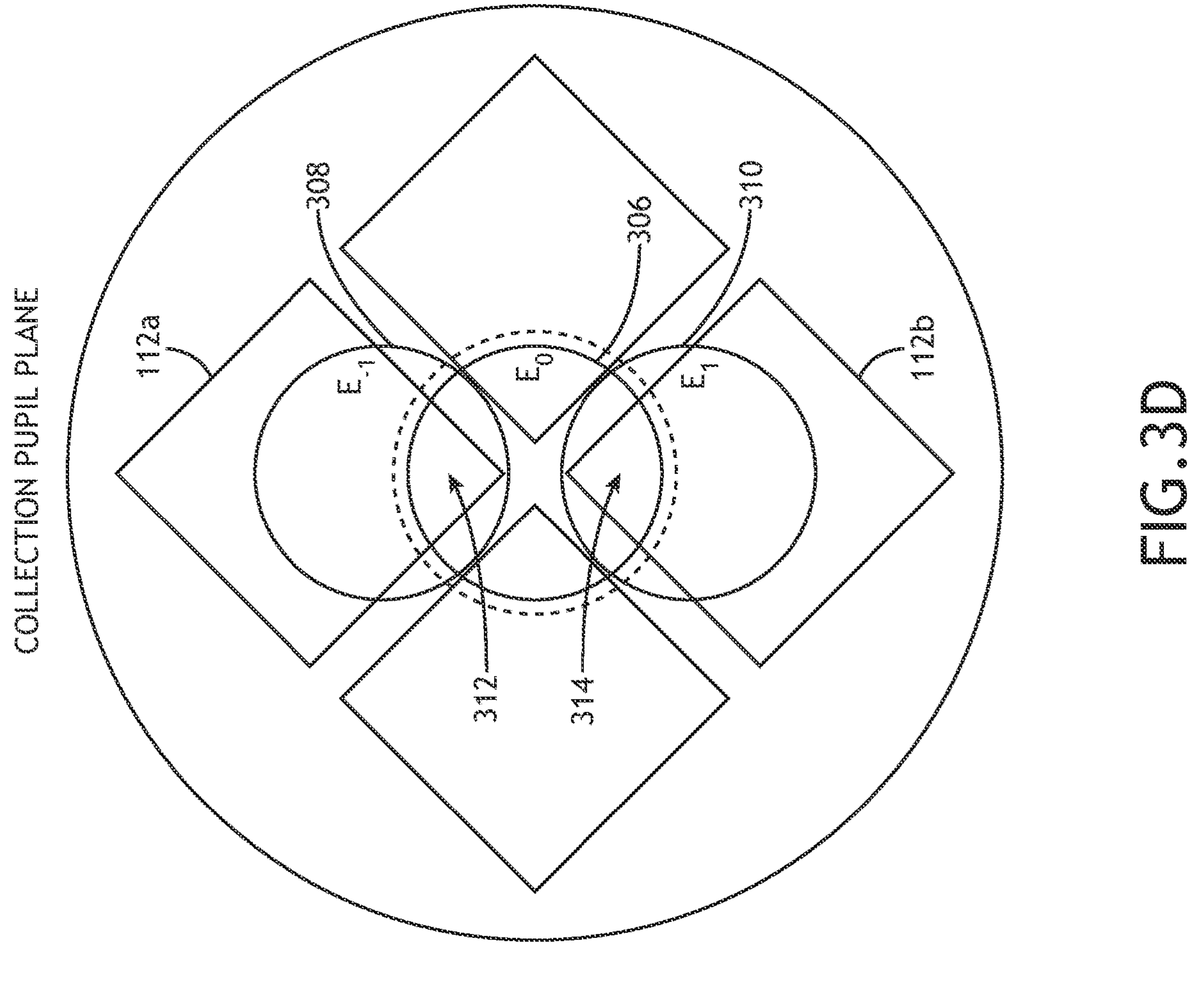
FIG. 3D is a top view of a collection pupil in the collection pupil plane of the overlay metrology sub-system, in accordance with one or more embodiments of the present disclosure.

FIG. 3A is a top view of an illumination pupil 302 in an illumination pupil plane 120 of the overlay metrology sub-system 102, in accordance with one or more embodiments of the present disclosure. For example, the illumination pupil plane 120 may correspond to a pupil plane in the illumination sub-system 106 as illustrated in FIG. 1B. FIGS. 3B-3D are top views of a collection pupil 304 in the collection pupil plane 114 of the overlay metrology sub-system 102, in accordance with one or more embodiments of the present disclosure. For example, the collection pupil plane 114 may correspond to a pupil plane 114 in the collection sub-system 110 as illustrated in FIG. 1B.

In embodiments, the illumination sub-system 106 illuminates the overlay target 202 with one or more illumination beams 108 at normal incidence (or near-normal incidence) as illustrated in FIG. 3A. Further, the one or more illumination beams 108 may illuminate the overlay target 202 with a limited range of incidence angles as illustrated by the limited size in the collection pupil plane 114. In this regard, the overlay target 202 may diffract the one or more illumination beams 108 into discrete diffraction orders.

FIGS. 3B-3C illustrate a distribution of 0-order diffraction 306, −1 order diffraction 308, and +1 order diffraction 310 distributed along the direction of periodicity of the grating-over-grating structure (e.g., the X direction here) in the collection pupil plane 114. In particular, the −1 order diffraction 308 and the +1 order diffraction 310 are distributed on opposite sides of the 0-order diffraction 306.

In embodiments, the illumination sub-system 106, the collection sub-system 110, and the overlay target 202 are configured to provide that the first-order diffraction (e.g., the −1 order diffraction 308 and the +1 order diffraction 310) partially overlaps the 0-order diffraction 306. For example, as illustrated in FIGS. 3B-3C, the −1 order diffraction 308 overlaps with the 0-order diffraction 306 to form a first overlap region 312, and the +1 order diffraction 310 overlaps with the 0-order diffraction 306 to form a second overlap region 314.

It is recognized herein that the distribution of diffracted orders of an illumination beam 108 by a periodic structure such as a grating-over-grating structure may be influenced by a variety of parameters such as, but not limited to, a wavelength of the illumination beam 108, an incidence angle of the illumination beam 108 in both altitude and azimuth directions, a period of the periodic structures, or a numerical aperture (NA) of a collection lens. Accordingly, in embodiments of the present disclosure, the illumination sub-system 106, the collection sub-system 110, and the overlay target 202 may be configured (e.g., according to a metrology recipe defining a selected set of associated parameters) to provide an overlapping distribution of 0-order diffraction 306 and first-order diffraction in the collection pupil plane 114 of the collection sub-system 110. For example, the illumination sub-system 106 and/or the collection sub-system 110 may be configured to generate measurements on grating-over-grating structures having a selected range of periodicities that provide the overlapping distribution. Further, various components of the illumination sub-system 106 and/or the collection sub-system 110 (e.g., stops, pupils, or the like) may be adjustable to provide the overlapping distribution for a given grating-over-grating structure with a given periodicity.

In embodiments, the overlay metrology sub-system 102 includes photodetectors 112 located in the overlap regions of the collection pupil plane 114. For example, as illustrated in FIGS. 3B and 3D, a first photodetector 112*a* is located in the first overlap region 312 and a second photodetector 112*b* is located in the second overlap region 314. Each of the photodetectors 112 may then capture a time-varying interference signal as the sample 104 is scanned. In particular, as an overlay target 202 is scanned along a direction of periodicity of a grating-over-grating structure (e.g., the X direction as shown in FIG. 3B or the Y direction as shown in FIG. 3D) the phase of the +/−1 diffraction orders 308,310 relative to the 0-order diffraction 306 shifts in opposite directions. By way of another example, as illustrated in FIG. 3C, the two or more photodetectors 112 may include four photodetectors, where a first set of two or more photodetectors may be arranged for measurements along the X direction and a second set of two or more photodetectors may be arranged for measurement along the Y direction.

It is contemplated herein that multi-directional measurements may be obtained using a variety of techniques, for example, as generally discussed in U.S. Pat. No. 11,300,405, issued on Apr. 12, 2022, which is herein incorporated by reference in the entirety. In embodiments, the overlay target may includes two sets of cells, where a first set of cells includes grating-over-grating structures oriented along a first diagonal direction different than but not orthogonal to a scan direction, and where a second set of cells includes grating-over-grating structures oriented along a second diagonal direction orthogonal to the first diagonal direction. In this way, overlay measurements along the first and second diagonal directions may be generated during a scan. Further, the scan may be implemented by translating the sample through a measurement field and/or by translating one or more illumination beams. In embodiments, a sample is scanned by a translation stage along a stage-scan direction and one or more illumination beams are scanned along a beam-scan direction that may be orthogonal to the stage-scan direction.

In this configuration, an overlay target may include two sets of cells, where a first set of cells includes grating-over-grating structures oriented along the stage-scan direction, and where a second set of cells includes grating-over-grating structures oriented along the beam-scan direction. Further, an illumination beam may travel along a diagonal path along each cell during a measurement.

In embodiments, the time-varying interference signals of a first cell are collected by a first photodetector and the time-varying interference signals of a second cell are collected by a second photodetector. For example, the time-varying interference signals on the photodetectors as a function of the stage-scan direction may be shown and described by Eq. (1) below:

$$I_{\pm 1}=(E_0+E_1)^2=I_0+2\sqrt{I_0 I_{\pm 1}}\times\cos\left[\frac{2\pi X}{P}+\phi\right] \quad \text{Eq. (1)}$$

where $I_{\pm 1}$ is the intensity of the scatterometry signal for first-order diffraction (e.g., −1-order diffraction and +1-order diffraction), $I_0$ is the intensity of the scatterometry signal for 0-order diffraction, $E_0$ is the amplitude of the 0-order diffraction signal, $E_1$ is the amplitude of the first-order diffraction signal, P is target pitch, Ø is an optical phase accumulation due to the path (e.g., optical phase accumulation along the scanning direction), and X is the position on the grating.

The amplitude and offset may be extracted from the oscillation signal collected to enable the isolation of $I_0$ and $I_{\pm 1}$.

In embodiments, calibration signals from the calibration cell 216 may be used to calibrate the time-varying interference signals from the measurement cell 204. In a non-limiting example, as shown in FIG. 2A, calibration signals may be generated from a blank calibration cell and may include $I_0$ values (or constant offset values) associated with the amount of 0-order light captured by each photodetector 112*a*, 112*b*. As another example, as shown in FIG. 2B, the calibration signals may be generated from the calibration gating structure 218 of the calibration cell 216 and may include peak-to-peak values of the time-varying interference signals (e.g., first-order diffraction light ($I_{\pm 1}$)) as well as $I_0$ values and associated with each photodetector 112*a*, 112*b*.

It is contemplated herein that the time-varying interference signals may be calibrated using any suitable technique. For example, the time-varying interference signals from a respective photodetector of the two or more photodetectors may be normalized based on the calibration signals from the calibration cell 216. For instance, the time-varying interference signals of the measurement cell 204 from the respective photodetector may be divided by at least one of $I_0$ or $I_{\pm 1}$ based on the calibration cell 216.

To measure overlay in the x- or y-direction, two cells with opposite intentional shifts ($\pm f_0$) may be used. In each cell, a differential signal D may be calculated based on the time-varying interference signals (as calculated using Eq. (1). For example, $I_{\pm 1}$ differential signal ($D_1$) for the first cell may be calculated according to Eq. (2.1), as shown and described below:

$$D_1=I_{+1}^{+f0}-I_{-1}^{+f0} \quad \text{Eq. (2.1)}$$

By way of another example, $I_{\pm 1}$ differential signal ($D_2$) for the second cell may be calculated according to Eq. (2.2), as shown and described below:

$$D_2=I_{+1}^{-f0}-I_{-1}^{-f0} \quad \text{Eq. (2.1)}$$

where $+f_0$ is the intended offset for the first cell and $-f_0$ is the intended offset for the second cell.

Accordingly, overlay (OVL) may be measured according to Eq. (3), as shown and described below:

$$OVL=f_0\frac{D1+D2}{D1-D2} \quad \text{Eq. (3)}$$

The photodetectors 112 may generally include any type of optical detector known in the art suitable for capturing interference signals generated as the sample 104 is translated by the translation stage 116 and/or as one or more illumination beams 108 are scanned by the beam-scanning sub-system 118. For example, the photodetectors 112 may include, but are not limited to, fast photodiodes. For instance, a non-limiting example, the fast photodiodes may include two fast diodes per direction (i.e., a four-diode detector), where each diode collects signal from 0-order and ±1-order diffractions.

In a general sense, the bandwidth or response time of the photodetectors 112 should be sufficient to resolve the temporal frequency of the interference fringes, which is related to the pitch of the grating-over-grating structures and the scanning speed along a measurement direction (the direction of periodicity of the grating-over-grating structure). For example, in the case of a scan speed along a measurement direction of 10 centimeters per second and a target pitch of 1 micrometer, the interference signals will oscillate at a rate on the order of 100 KHz. In one embodiment, the photodetectors 112 include photodetectors having a bandwidth of at least 1 GHz. However, it is to be understood that this value is not a requirement. Rather, the bandwidth of the photodetectors 112, the translation speed along the measurement direction, and the pitch of the grating-over-grating structures may be selected together to provide a desired sampling rate of the interference signal.

Referring again to FIG. 1A, additional components of the overlay metrology sub-system 102 are described in greater detail in accordance with one or more embodiments of the present disclosure.

In embodiments, the system 100 includes a controller 122 communicatively coupled to the overlay metrology sub-system 102. The controller 122 may include one or more processors 124 and a memory device 126, or memory. For example, the one or more processors 124 may be configured to execute a set of program instructions maintained in the memory device 126.

The one or more processors 124 of the controller 122 may generally include any processor or processing element known in the art. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors 124 may include any device configured to execute algorithms and/or instructions (e.g., program instructions stored in memory). In one embodiment, the one or more processors 124 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 122 may include one or more controllers housed in a common housing or within multiple housings. In this way, any controller or combination of controllers may be separately packaged as a module suitable for integration into metrology system 100. Further, the controller 122 may analyze or otherwise process data received from the photodetectors 112 and feed the data to additional components within the system 100 or external to the system 100.

Further, the memory device 126 may include any storage medium known in the art suitable for storing program instructions executable by the associated one or more processors 124. For example, the memory device 126 may include a non-transitory memory medium. As an additional example, the memory device 126 may include, but is not limited to, a read-only memory, a random-access memory, a magnetic or optical memory device (e.g., disk), a magnetic tape, a solid-state drive and the like. It is further noted that memory device 126 may be housed in a common controller housing with the one or more processors 124.

In this regard, the controller 122 may execute any of various processing steps associated with overlay metrology. For example, the controller 122 may be configured to generate control signals to direct or otherwise control the overlay metrology sub-system 102, or any components thereof. For instance, the controller 122 may be configured to direct the translation stage 116 to translate the sample 104 along one or more measurement paths, or swaths, to scan one or more overlay targets through a measurement field of view of the overlay metrology sub-system 102 and/or direct the beam-scanning sub-system 118 to position or scan one or more illumination beams 108 on the sample 104. By way of another example, the controller 122 may be configured to receive signals corresponding to the time-varying interference signals from the photodetectors 112. By way of another example, the controller 122 may generate correctables for one or more additional fabrication sub-systems as feedback and/or feed-forward control of the one or more additional fabrication sub-systems based on overlay measurements from the overlay metrology sub-system 102.

In embodiments, the controller 122 captures the interference signals detected by the photodetectors 112. The controller 122 may generally capture data using any suitable technique known. Further, the controller 122 may capture the interference signals, or any data associated with the interference signals, using any combination of hardware (e.g., circuitry) or software techniques.

In embodiments, the controller 122 determines an overlay measurement based on differential signals between the two or more photodetectors 112. For example, the controller 122, using Eq. (1)-(2.2) described above, may be configured to determine one or more differential signals between the two or more photodetectors 112. Further, the controller 122, using Eq. (3) described above, may be configured to determine overlay based on the determined differential signals.

Further, the controller 122 may calibrate or otherwise modify the overlay measurement based on known, assumed, or measured features of the sample that may also impact the time-varying interference signals. It is contemplated herein that the time-varying interference signals may be calibrated using any suitable technique. For example, the time-varying interference signals from a respective photodetector of the two or more photodetectors may be normalized based on the calibration signals from the calibration cell 216. For instance, the time-varying interference signals of the measurement cell 204 from the respective photodetector may be divided by at least one of $I_0$ or $I_{\pm 1}$ based on the calibration cell 216. As previously discussed herein, the calibration signals may be generated using the calibration cell 216. In a non-limiting example, calibration signals may be generated from a blank calibration cell and may include $I_0$ values (or constant offset values) associated with the amount of 0-order light captured by each photodetector 112*a*, 112*b*. As another example, the calibration signals may be generated from the calibration gating structure 218 of the calibration cell 216 and may include peak-to-peak values of the time-varying interference signals (e.g., first-order diffraction light ($I_{\pm 1}$)) as well as $I_0$ values and associated with each photodetector 112*a*, 112*b*.

Referring again to FIG. 1B, various components of the overlay metrology sub-system 102 are described in greater detail in accordance with one or more embodiments of the present disclosure.

In embodiments, the illumination sub-system 106 includes an illumination source 128 configured to generate at least one illumination beam 108. The illumination from the illumination source 128 may include one or more selected wavelengths of light including, but not limited to, ultraviolet (UV) radiation, visible radiation, or infrared (IR) radiation.

The illumination source 128 may include any type of illumination source suitable for providing at least one illumination beam 108. In embodiments, the illumination source 128 is a laser source. For example, the illumination source 128 may include, but is not limited to, one or more narrowband laser sources, a broadband laser source, a supercontinuum laser source, a white light laser source, or the like. In this regard, the illumination source 128 may provide an illumination beam 108 having high coherence (e.g., high spatial coherence and/or temporal coherence). In embodiments, the illumination source 128 includes a laser-sustained plasma (LSP) source. For example, the illumination source 128 may include, but is not limited to, a LSP lamp, a LSP bulb, or a LSP chamber suitable for containing one or more elements that, when excited by a laser source into a plasma state, may emit broadband illumination.

In embodiments, the illumination sub-system 106 includes one or more optical components suitable for modifying and/or conditioning the illumination beam 108 as well as directing the illumination beam 108 to the sample 104. For example, the illumination sub-system 106 may include one or more illumination lenses 130 (e.g., to collimate the illumination beam 108, to relay an illumination pupil plane 120 and/or an illumination field plane 132, or the like). In embodiments, the illumination sub-system 106 includes one or more illumination control optics 134 to shape or otherwise control the illumination beam 108. For example, the illumination control optics 134 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In embodiments, the overlay metrology sub-system 102 includes an objective lens 136 to focus the illumination beam 108 onto the sample 104 (e.g., an overlay target 202 with overlay target elements located on two or more layers of the sample 104).

In embodiments, the illumination sub-system 106 illuminates the sample 104 with two or more illumination beams 108. Further, the two or more illumination beams 108 may be, but are not required to be, incident on different portions of the sample 104 (e.g., different cells of an overlay target) within a measurement field of view (e.g., a field of view of the objective lens 136). It is contemplated herein that the two or more illumination beams 108 may be generated using a variety of techniques. In embodiments, the illumination sub-system 106 includes two or more apertures at an illumination field plane 132. In embodiments, the illumination sub-system 106 includes one or more beamsplitters to split illumination from the illumination source 128 into the two or more illumination beams 108. In embodiments, at least one illumination source 128 generates two or more illumination beams 108 directly. In a general sense, each illumination beam 108 may be considered to be a part of a different illumination channel regardless of the technique in which the various illumination beams 108 are generated.

In embodiments, the collection sub-system 110 includes at least two photodetectors 112 located at a collection pupil plane 114 configured to capture light from the sample 104 (e.g., collected light 138), where the collected light 138 includes at least the 0-order diffraction 306, the −1 order diffraction 308, and the +1 order diffraction 310 as illustrated in FIG. 3B. The collection sub-system 110 may include one or more optical elements suitable for modifying and/or conditioning the collected light 138 from the sample 104. In embodiments, the collection sub-system 110 includes one or more collection lenses 140 (e.g., to collimate the illumination beam 108, to relay pupil and/or field planes, or the like), which may include, but are not required to include, the objective lens 136. In another embodiment, the collection sub-system 110 includes one or more collection control optics 142 to shape or otherwise control the collected light 138. For example, the collection control optics 142 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In embodiments, the collection sub-system 110 includes two or more collection channels 144, each with a separate pair of photodetectors 112. For example, as illustrated in FIG. 1B, the overlay metrology sub-system 102 may include one or more beamsplitters 146 arranged to split the collected light 138 into the collection channels 144. Further, the beamsplitters 146 may be polarizing beamsplitters, non-polarizing beamsplitters, or a combination thereof.

In embodiments, multiple collection channels 144 are configured to collect light from multiple illumination beams 108 on the sample 104. For example, in the case that an overlay target 202 has two or more cells 204 distributed in a direction different than a scan direction, the overlay metrology sub-system 102 may simultaneously illuminate the different cells 204 with different illumination beams 108 and simultaneously capture interference signals associated with each illumination beam 108. Additionally, in some embodiments, multiple illumination beams 108 directed to the sample 104 may have different polarizations. In this way, the diffraction orders associated with each of the illumination beams 108 may be separated. For example, polarizing beamsplitters 146 may efficiently separate the diffraction orders associated with the different illumination beams 108. By way of another example, polarizers may be used in one or more collection channels 144 to isolate desired diffraction orders for measurement.

In embodiments, the overlay metrology sub-system 102 includes a beam-scanning sub-system 118 to position, scan, or modulate positions of one or more illumination beams 108 on the sample 104 during measurement.

The beam-scanning sub-system 118 may include any type or combination of elements suitable for scanning positions of one or more illumination beams 108. In one embodiment, the beam-scanning sub-system 118 includes one or more deflectors suitable for modifying a direction of an illumination beam 108. For example, a deflector may include, but is not limited to, a rotatable mirror (e.g., a mirror with adjustable tip and/or tilt). Further, the rotatable mirror may be actuated using any technique known in the art. For example, the deflector may include, but is not limited to, a galvanometer, a piezo-electric mirror, or a micro-electro-mechanical system (MEMS) device. By way of another example, the beam-scanning sub-system 118 may include an electro-optic modulator, an acousto-optic modulator, or the like.

The deflectors may further be positioned at any suitable location in the overlay metrology sub-system 102. In one embodiment, one or more deflectors are placed at one or more pupil planes common to both the illumination sub-system 106 and the collection sub-system 110. In this regard, the beam-scanning sub-system 118 may be a pupil-plane beam scanner and the associated deflectors may modify the positions of one or more illumination beams 108 on the sample 104 without impacting positions of diffraction orders in the collection pupil plane 114. Further, a distribution of one or more illumination beams 108 in an illumination field plane 132 may further be stable as the beam-scanning sub-system 118 modifies positions of the one or more illumination beams 108 on the sample 104. Pupil-plane beam scanning is described generally in U.S. Pat. No. 11,300,524, issued on Apr. 12, 2022, which is incorporated by reference in its entirety.

Figure 4:
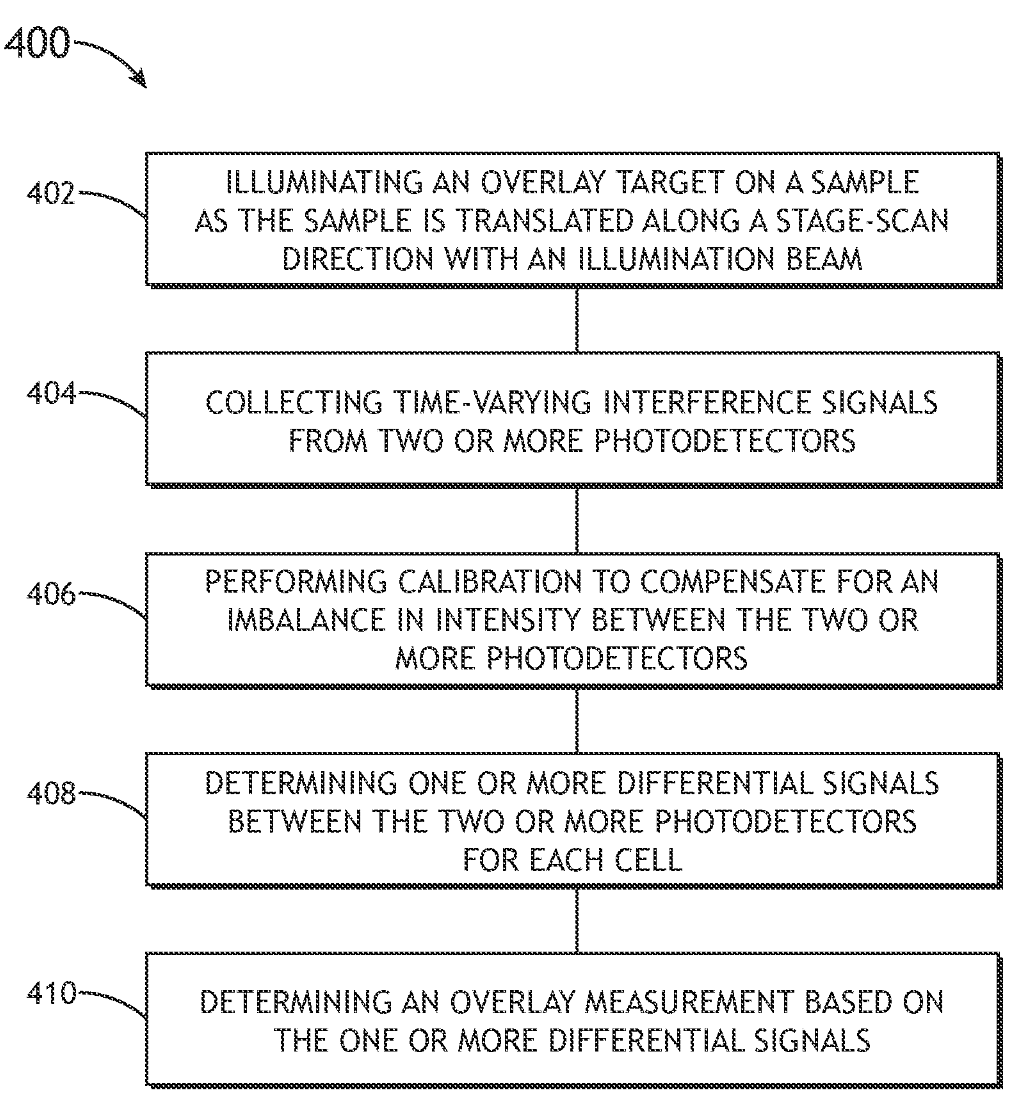
FIG. 4 is a flow diagram illustrating a method for performing scanning diffraction based overlay metrology, in accordance with one or more embodiments of the present disclosure.

FIG. 4 is a flow diagram illustrating a method 400 for performing scanning DBO scatterometry metrology in accordance with one or more embodiments of the present disclosure. Applicant notes that the embodiments and enabling technologies described previously herein in the context of the system 100 should be interpreted to extend to the method 400. It is further noted, however, that the method 900 is not limited to the architecture of the system 100.

In embodiments, the method 400 includes a step 402 of illuminating an overlay target with one or more cells on a sample having grating-over-grating structures as the sample is translated along a stage-scan direction with an illumination beam, where 0-order diffraction overlaps with first-order diffraction in a collection pupil.

In embodiments, the method 400 includes a step 404 of collecting time-varying interference signals from two photodetectors placed in overlapping regions between the 0-order diffraction and the first-order diffraction in the collection pupil.

In embodiments, the method 400 includes a step 406 of performing calibration to compensate for an imbalance in intensity between the two or more photodetectors. For example, the controller 122 may be configured to receive one or more calibration signals from the calibration cell 216 and calibrate the time-varying interference signals based on such calibration signals. In a non-limiting example, as shown in FIG. 2A, calibration signals may be generated from a blank calibration cell and may include $I_0$ values (or constant offset values) associated with the amount of 0-order light captured by each photodetector 112*a*, 112*b*. As another example, as shown in FIG. 2B, the calibration signals may be generated from the calibration gating structure 218 of the calibration cell 216 and may include peak-to-peak values of the time-varying interference signals (e.g., first-order diffraction light ($I_{\pm 1}$)) as well as $I_0$ values and associated with each photodetector 112*a*, 112*b*.

It is contemplated herein that the time-varying interference signals may be calibrated using any suitable technique. For example, the controller 122 may be configured to normalize the time-varying interference signals acquired from the measurement cell using each photodetector of the two or more photodetectors by dividing the time-varying interference signals from each photodetector by at least one of $I_0$ or $I_{\pm 1}$ acquired by a respective photodetector of the two or more photodetectors using the calibration cell.

In embodiment, the method 400 includes a step 408 of determining one or more differential signals between the two photodetectors for each cell of the plurality of cells. For example, as previously discussed herein, differential signals for each cell may be determined using Eq. (1)-(2.2) described above.

In embodiments, the method 400 includes a step 410 of determining an overlay measurement based on the differential signals from the two photodetectors. For example, as previously discussed herein, overlay may be determined using Eq. 3 described above.

It is contemplated herein that the method 400 may be applied to a wide variety of overlay target designs suitable for 1D or 2D metrology measurements. In embodiments, the method 400 includes simultaneously scanning multiple illumination beams and collecting the associated overlapping diffraction orders for parallel measurements. In embodiments, the method 400 includes scanning one or more illumination beams along a beam-scan direction different than the stage-scan direction to provide a diagonal or triangle-wave path across the sample. In this regard, cells having grating-over-grating structures with different directions of periodicity may be efficiently interrogated by a common illumination beam in a measurement swath.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An overlay metrology system comprising:

an illumination sub-system comprising:

one or more illumination sources configured to generate one or more illumination beams; and one or more illumination optics configured to direct the one or more illumination beams to an overlay target on a sample as the sample is scanned along a stage-scan direction by a translation stage when implementing a metrology recipe, wherein the overlay target in accordance with the metrology recipe includes a plurality of measurement cells, wherein each measurement cell includes a grating-over-grating structures including a first-layer grating feature on a first layer of the sample and a second-layer grating feature on a second layer of the sample in an overlapping region, wherein the first-layer grating feature and the second-layer grating feature have a common pitch;

a collection sub-system comprising:

a first photodetector located in a pupil plane at a location of overlap between 0-order diffraction from the overlay target and +1-order diffraction from the overlay target;

a second photodetector located in a pupil plane at a location of overlap between 0-order diffraction from the overlay target and −1-order diffraction from the overlay target; and one or more collection optics; and a controller communicatively coupled to the first photodetector and the second photodetector, the controller including one or more processors configured to execute program instructions causing the one or more processors to:

receive time-varying interference signals from the first photodetector and the second photodetector as the overlay target is scanned along the stage-scan direction;

determine one or more differential signals between the first photodetector and the second photodetector for each measurement cell of the plurality of measurement cells;

determine an overlay measurement based on the determined one or more differential signals, wherein the sample includes a calibration cell arranged proximate to a measurement cell of the plurality of measurement cells; and calibrate the time-varying interference signals from the first photodetector and the second photodetector using the one or more calibration signals from the calibration cell to calibrate for misalignment between the first photodetector or the second photodetector, wherein the calibration cell includes a blank area configured to be scanned as the sample is scanned to generate one or more constant calibration signals associated with the amount of 0-order light captured by each of the first photodetector and the second photodetector, wherein the calibration cell includes a calibration grating structure configured to be scanned as the sample is scanned to generated one or more calibration signals including peak-to-peak values of the time time-varying interference signals.

2. The overlay metrology system of claim 1, wherein the calibration grating structure has the similar pitch as the first-layer grating feature and the second-layer grating feature.

3. The overlay metrology system of claim 1, wherein the one or more calibration signals include calibration signals associated with at least one of 0-order light or diffracted light.

4. The overlay metrology system of claim 3, wherein the controller is further configured to:

normalize the time-varying interference signals from the first photodetector and the second photodetector based on the one or more calibration signals to generate calibrated time-varying interference signals; and determine the overlay measurement based on the calibrated time-varying interference signals.

5. The overlay metrology system of claim 4, wherein the normalize the time-varying interference signals from the first photodetector and the second photodetector based on the one or more calibration signals comprises:

dividing the time-varying interference signals from the first photodetector and the second photodetector by at least one of the 0-order light or the diffracted light.

6. The overlay metrology system of claim 1, wherein the received time-varying interference signal from the first photodetector and the second photodetector as a function of the stage-scan direction is represented by:

$$I_{\pm1} = (E_0 + E_1)^2 = I_0 + 2\sqrt{I_0 I_{\pm1}} \times \cos\left[\frac{2\pi X}{P} + \emptyset\right],$$

where $L_{\pm1}$ is an intensity of a scatterometry signal for first-order diffraction, $I_0$ is an intensity of a scatterometry signal for 0-order diffraction, $E_0$ is an amplitude of a 0-order diffraction signal, $E_1$ is an amplitude of a first-order diffraction signal, P is a target pitch, Ø is an optical phase accumulation due to a path, and X is a position on a grating.

7. The overlay metrology system of claim 6, wherein an amplitude and offset is extracted to isolate $L_{\pm1}$.

8. The overlay metrology system of claim 6, wherein a first differential signal ($D_1$) between the first photodetector and the second photodetector for a first measurement cell of the plurality of measurement cells is determined by:

$$D_1 = I_{+1}^{+f0} - I_{-1}^{+f0},$$

where +f0 is an intended offset of the first measurement cell.

9. The overlay metrology system of claim 8, wherein a second differential signal ($D_2$) between the first photodetector and the second photodetector for a second measurement cell of the plurality of measurement cells is determined by:

$$D_2 = I_{+1}^{-f0} - I_{-1}^{-f0},$$

where −f0 is an intended offset of the second measurement cell.

10. The overlay metrology system of claim 9, wherein the overlay measurement (OVL) based on the determined first differential signal for the first measurement cell and the determined second differential signal for the second measurement cell is determined by:

$$OVL = f_0 \frac{D1 + D2}{D1 - D2}.$$

11. An overlay metrology system comprising:

a controller communicatively coupled to a first photodetector and a second photodetector, the controller including one or more processors configured to execute program instructions causing the one or more processors to:

receive time-varying interference signals from the first photodetector and the second photodetector as an overlay target is scanned along a stage-scan direction by a translation stage when implementing a metrology recipe, wherein the overlay target in accordance with the metrology recipe includes a plurality of measurement cells, wherein each measurement cell includes a grating-over-grating structures including a first-layer grating feature on a first layer of a sample and a second-layer grating feature on a second layer of the sample in an overlapping region, wherein the first-layer grating feature and the second-layer grating feature have a similar pitch;

determine one or more differential signals between the first photodetector and the second photodetector for each measurement cell of the plurality of measurement cells;

determine an overlay measurement based on the determined one or more differential signals, wherein the sample includes a calibration cell arranged proximate to a measurement cell of the plurality of measurement cells; and calibrate the time-varying interference signals from the first photodetector and the second photodetector using one or more calibration signals from the calibration cell to calibrate for misalignment between the first photodetector or the second photodetector, wherein the calibration cell includes a blank area configured to be scanned as the sample is scanned to generate one or more constant calibration signals associated with the amount of 0-order light captured by each of the first photodetector and the second photodetector, wherein the calibration cell includes a calibration grating structure configured to be scanned as the sample is scanned to generated one or more calibration signals including peak-to-peak values of the time time-varying interference signals.

12. The overlay metrology system of claim 11, wherein the calibration grating structure has the similar pitch as the first-layer grating feature and the second-layer grating feature.

13. The overlay metrology system of claim 11, wherein the one or more calibration signals include calibration signals associated with at least one of 0-order light or diffracted light.

14. The overlay metrology system of claim 13, wherein the controller is further configured to:

normalize the time-varying interference signals from the first photodetector and the second photodetector based on the one or more calibration signals to generate calibrated time-varying interference signals; and determine the overlay measurement based on the calibrated time-varying interference signals.

15. The overlay metrology system of claim 14, wherein the normalize the time-varying interference signals from the first photodetector and the second photodetector based on the one or more calibration signals comprises:

dividing the time-varying interference signals from the first photodetector and the second photodetector by at least one the 0-order light or the diffracted light.

16. The overlay metrology system of claim 11, wherein the received time-varying interference signal from the first photodetector and the second photodetector as a function of the stage-scan direction is represented by:

$$I_{\pm} = (E_0 + E_1)^2 = I_0 + 2\sqrt{I_0 I_{\pm 1}} \times \cos\left[\frac{2\pi X}{P} + \phi\right],$$

where $L_{\pm 1}$ is an intensity of a scatterometry signal for first-order diffraction, $I_0$ is an intensity of a scatterometry signal for 0-order diffraction, $E_0$ is an amplitude of a 0-order diffraction signal, $E_1$ is an amplitude of a first-order diffraction signal, P is a target pitch, Ø is an optical phase accumulation due to a path, and X is a position on a grating.

17. The overlay metrology system of claim 16, wherein an amplitude and offset is extracted to isolate $L_{\pm 1}$.

18. The overlay metrology system of claim 16, wherein a first differential signal between the first photodetector and the second photodetector for a first measurement cell of the plurality of measurement cells is determined by:

$$D_1 = I_{+1}^{+f0} - I_{-1}^{+f0},$$

where +f0 is an intended offset of the first measurement cell.

19. The overlay metrology system of claim 18, wherein a second differential signal between the first photodetector and the second photodetector for a second cell of the plurality of measurement cells is determined by:

$$D_2 = I_{+1}^{-f0} - I_{-1}^{-f0},$$

where −f0 is an intended offset of the second measurement cell.

20. The overlay metrology system of claim 19, wherein the overlay measurement based on the determined first differential signal for the first measurement cell and the determined second differential signal for the second measurement cell is determined by:

$$OVL = f_0 \frac{D1 + D2}{D1 - D2}.$$

21. A method comprising:

illuminating an overlay target with a plurality of measurement cells on a sample having grating-over-grating structures as the sample is translated along a stage-scan direction with an illumination beam, where 0-order diffraction overlaps with first-order diffraction in a collection pupil;

receiving time-varying interference signals from a first photodetector and a second photodetector as an overlay target is scanned along a stage-scan direction by a translation stage when implementing a metrology recipe, wherein the overlay target in accordance with the metrology recipe includes a plurality of measurement cells, wherein each measurement cell includes a grating-over-grating structures including a first-layer grating feature on a first layer of the sample and a second-layer grating feature on a second layer of the sample in an overlapping region, wherein the first-layer grating feature and the second-layer grating feature have a similar pitch;

determining one or more differential signals between the first photodetector and the second photodetector for each measurement cell of the plurality of measurement cells;

determining an overlay measurement based on the determined one or more differential signals, wherein the sample includes a calibration cell arranged proximate to a measurement cell of the plurality of measurement cells; and calibrating the time-varying interference signals from the first photodetector and the second photodetector using one or more calibration signals from the calibration cell to calibrate for misalignment between the first photodetector or the second photodetector, wherein the calibration cell includes a blank area configured to be scanned as the sample is scanned to generate one or more constant calibration signals associated with the amount of 0-order light captured by each of the first photodetector and the second photodetector, wherein the calibration cell includes a calibration grating structure configured to be scanned as the sample is scanned to generated one or more calibration signals including peak-to-peak values of the time time-varying interference signals.

22. The method of claim 21, wherein the one or more calibration signals from the calibration cell include at least one of 0-order light or diffracted light.

23. The method of claim 22, further comprising:

normalizing the time-varying interference signals from the first photodetector and the second photodetector based on the one or more calibration signals to generate calibrated time-varying interference signals; and determining the overlay measurement based on the calibrated time-varying interference signals.

24. The method of claim 23, wherein the normalizing the time-varying interference signals from the first photodetector and the second photodetector based on the one or more calibration signals comprises:

dividing the time-varying interference signals from the first photodetector and the second photodetector by at least one of the 0-order light or the diffracted light.

* * * * *